(12) United States Patent  (10) Patent No.: US 8,014,140 B2
Kitamura et al.  (45) Date of Patent: Sep. 6, 2011

(54) ELECTRONIC APPARATUS HAVING AN EXTERNAL CONNECTOR

(75) Inventors: Tomoko Kitamura, Ome (JP); Toshikazu Shiroishi, Ome (JP); Masataka Tokoro, Tachikawa (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 200 days.

(21) Appl. No.: 12/536,368

(22) Filed: Aug. 5, 2009

(65) Prior Publication Data

US 2010/0073858 A1 Mar. 25, 2010

(30) Foreign Application Priority Data

Sep. 25, 2008 (JP) .................................. 2008-245974

(51) Int. Cl.
  *G06F 1/16* (2006.01)
(52) U.S. Cl. ................ 361/679.27; 439/567; 455/550.1; 345/163; 248/349.1
(58) Field of Classification Search ............. 361/679.27, 361/679.09, 679.41, 679.56, 679.22, 679.29, 361/679.06, 679.42; 439/409, 567, 31, 331; 248/585, 371, 176.1, 349.1; 16/367, 382, 16/342, 366; 345/179, 163, 173; 455/575.1, 455/347, 550.1, 90.3, 556.1
See application file for complete search history.

(56) References Cited

U.S. PATENT DOCUMENTS

| | | | |
|---|---|---|---|
| 7,462,058 B2 | 12/2008 | Tanaka et al. | |
| 7,489,507 B2 | 2/2009 | Karashima et al. | |
| 7,656,652 B2 * | 2/2010 | Moser | 361/679.27 |
| 2003/0109232 A1 * | 6/2003 | Park et al. | 455/90 |
| 2004/0090742 A1 * | 5/2004 | Son et al. | 361/686 |
| 2004/0203994 A1 * | 10/2004 | Won et al. | 455/522 |
| 2005/0117286 A1 | 6/2005 | Karashima et al. | |
| 2007/0218726 A1 | 9/2007 | Tanaka et al. | |
| 2009/0040694 A1 | 2/2009 | Karashima et al. | |
| 2009/0040707 A1 | 2/2009 | Karashima et al. | |
| 2009/0102744 A1 * | 4/2009 | Ram | 345/1.1 |
| 2010/0073858 A1 | 3/2010 | Kitamura et al. | |
| 2011/0063175 A1 * | 3/2011 | Uno et al. | 343/702 |

FOREIGN PATENT DOCUMENTS

| | | |
|---|---|---|
| JP | 5189086 | 7/1993 |
| JP | 7028559 | 1/1995 |
| JP | 11338580 | 12/1999 |
| JP | 2000-194443 | 7/2000 |
| JP | 2000-267759 | 9/2000 |
| JP | 2001-273053 | 10/2001 |
| JP | 2002084117 | 3/2002 |
| JP | 2003-087378 | 3/2003 |

(Continued)

OTHER PUBLICATIONS

Japanese Patent Application No. 2010-262387, Notice of Reasons for Rejection, mailed Feb. 15, 2011, (English Translation).

*Primary Examiner* — Hung V Duong
(74) *Attorney, Agent, or Firm* — Blakely, Sokoloff, Taylor & Zafman LLP

(57) ABSTRACT

According to one embodiment, an electronic apparatus includes a housing and a hinge arm. The housing has peripheral wall having an opening. The hinge arm is made of metal and secured in the housing, extending along the peripheral wall. The hinge arm has a connector holding part that opposes the opening. An external connector is secured to the connector holding part. The external connector is exposed outside the housing through the opening.

9 Claims, 4 Drawing Sheets

FOREIGN PATENT DOCUMENTS

| | | |
|---|---|---|
| JP | 2004-360920 | 12/2004 |
| JP | 2005-128805 | 5/2005 |
| JP | 2005-217297 | 8/2005 |
| JP | 2007-250493 | 9/2007 |
| JP | 2010079518 | 4/2010 |
| WO | 2006077653 | 7/2006 |

\* cited by examiner

ELECTRONIC APPARATUS HAVING AN EXTERNAL CONNECTOR

CROSS-REFERENCE TO RELATED APPLICATIONS

This application is based upon and claims the benefit of priority from Japanese Patent Application No. 2008-245974, filed Sep. 25, 2008, the entire contents of which are incorporated herein by reference.

BACKGROUND

1. Field

One embodiment of the present invention relates to an electronic apparatus having an external connector to which peripheral equipment such as an external monitor may be connected.

2. Description of the Related Art

A portable computer, which is an example of an electronic apparatus, comprises a computer main module and a display module. The computer main module has a housing, or an outer shell. The display module is supported at the rear end of the computer main module and can rotate. To a sidewall or the rear wall of the housing, an external connector is provided for connecting the peripheral equipment such as an external monitor.

The external connector of the conventional portable computer is mounted to the housing via a dedicated connector panel. The connector panel is provided in the housing, extending along a sidewall or the rear wall of the housing. The external connector is secured to the connector panel by fastening means such as screws.

In the conventional structure, a dedicated connector panel must be used to secure the external connector to the housing of the portable computer. This means that the portable computer needs to have an additional component and a space for accommodating the connector panel. The use of the connector panel inevitably prevents the housing from becoming thin and light.

As disclosed in, for example, Jpn. Pat. Appln. KOKAI Publication No. 2003-128805, the portable computer may have a pair of hinge devices that connects the display module to the computer main module, enabling the display module to rotate with respect to the computer main module. The hinge devices are spaced apart widthwise relative to the computer main module and have a hinge pin each, which extends widthwise relative to the computer main module.

The portable computer disclosed in Publication No. 2005-128805 has a connector that is configured to connect an AC adaptor to one end of the hinge pin of one hinge device. At one side of the portable computer, the connector is exposed outside the hinge pin with respect to the width of the portable computer.

With this structure, the connector can be arranged in the dead space available at said end of the hinge pin. No extra space need be provided in the computer main module in order to accommodate the connector. This helps make the computer main module thin.

However, the portable computer disclosed in Publication No. 2005-128805 is not designed on the assumption that the connector should be secured to the computer main module by using any component of the hinge device. Consequently, a bracket or a similar member must be used to position the connector at the end of the hinge pin.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

DETAILED DESCRIPTION

Various embodiments according to the invention will be described hereinafter with reference to the accompanying drawings. In general, according to one embodiment of the invention, an electronic apparatus comprises a housing having a peripheral wall that has an opening, and a hinge arm made of metal, secured in the housing and extending along the peripheral wall. The hinge arm has a connector holding part that opposes the opening. An external connector is secured to the connector holding part of the hinge arm and is exposed outside the housing through the opening.

An embodiment of this invention will be described with reference to the accompanying drawings.

Figure 1:
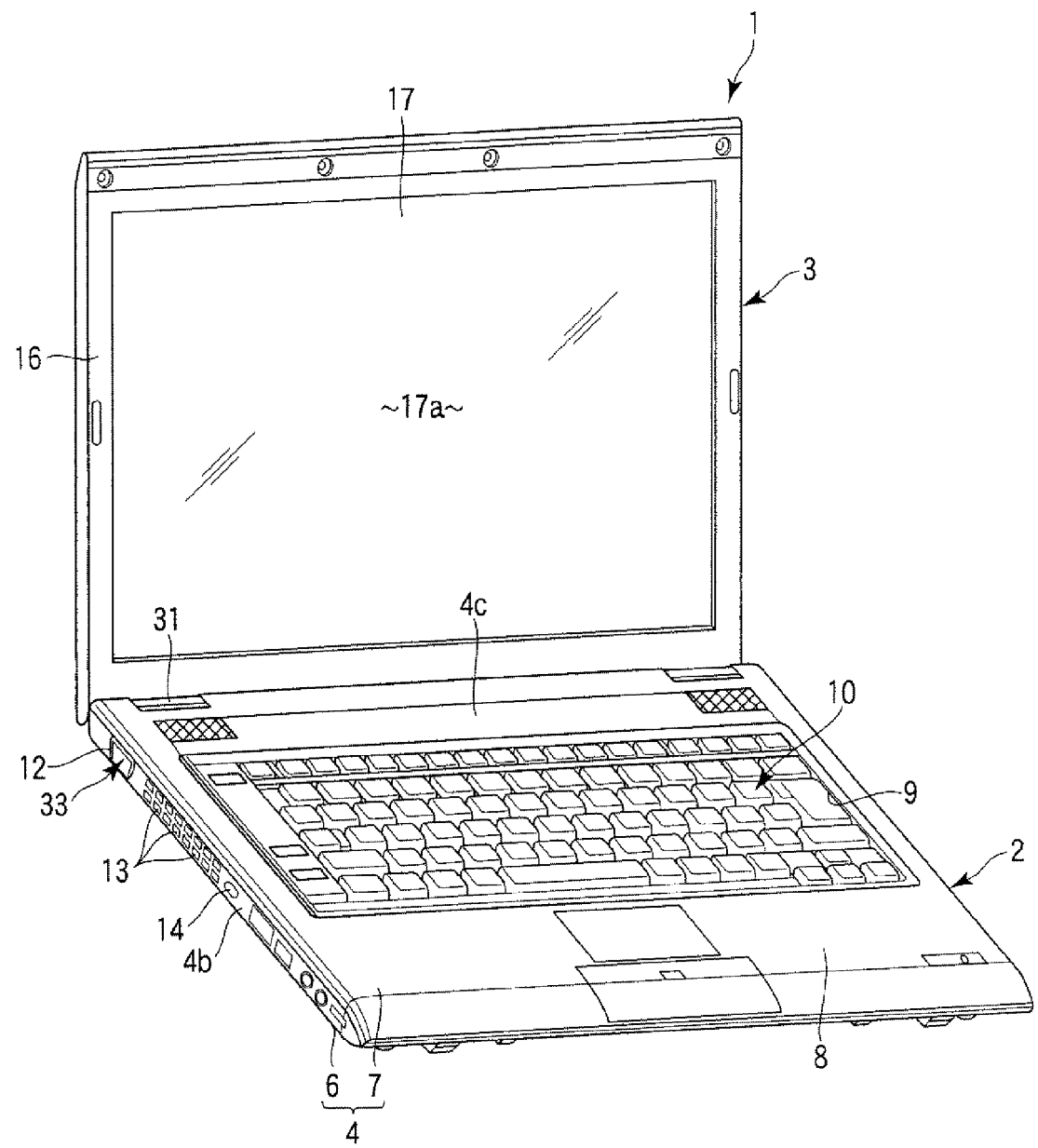
FIG. 1 is an exemplary perspective view of a portable computer according to an embodiment of the present invention.
Figure 2:
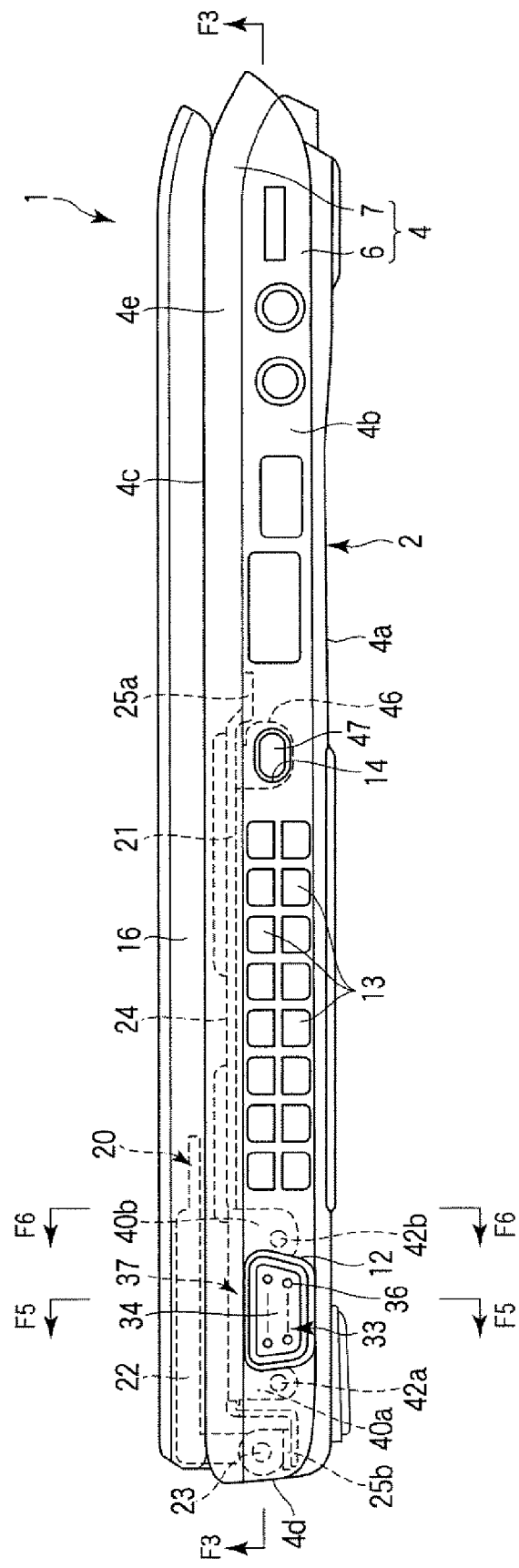
FIG. 2 is an exemplary side view of the portable computer according to the embodiment of the invention.

FIGS. 1 and 2 show a portable computer, which is an example of an electronic apparatus. The portable computer 1 comprises the computer main module 2 and a display module 3.

The computer main module 2 has a first housing 4 that is made of synthetic resin. The first housing 4 contains a printed circuit board, an optical disk module, and a heat sink 5, all being major components of the computer main module 2. The printed circuit board holds, for example, a CPU. The heat sink 5 is configured to radiate the heat generated by the CPU.

The first housing 4 is shaped like a flat box, having a bottom wall 4a, left and right sidewalls 4b (only the left sidewall is shown), a top wall 4c, and rear wall 4d. The sidewalls 4b and the rear wall 4d are peripheral walls, each standing from one edge of the bottom wall 4a.

Figure 3:
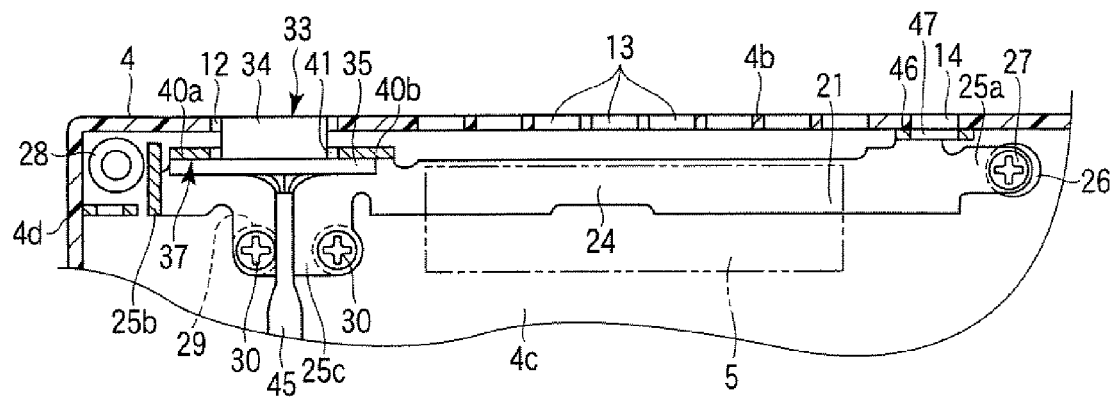
FIG. 3 is an exemplary sectional view taken along line F3-F3 in FIG. 2.
Figure 5:
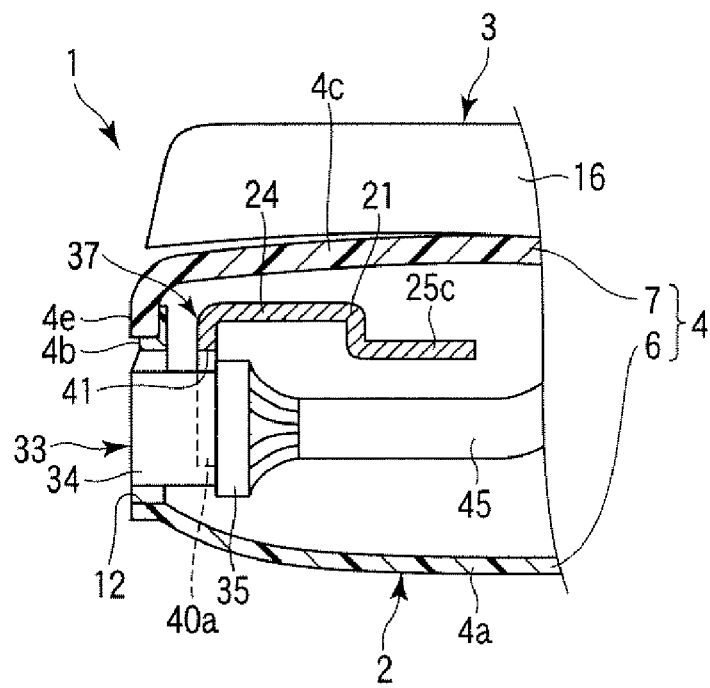
FIG. 5 is an exemplary sectional view taken along line F5-F5 in FIG. 2.
Figure 6:
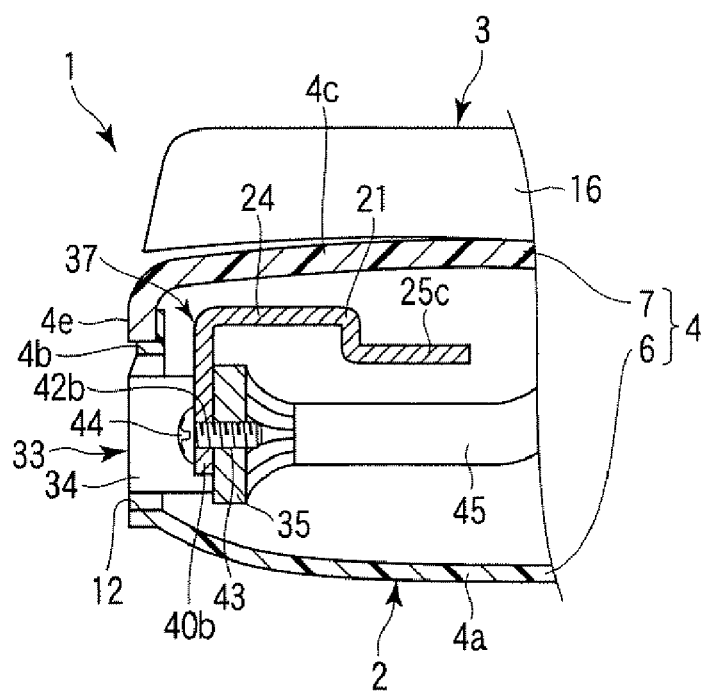
FIG. 6 is an exemplary sectional view taken along line F6-F6 in FIG. 2.

As FIGS. 3, 5 and 6 show, the first housing 4 is composed of a bottom case 6 and a top cover 7. The bottom case 6 has the bottom wall 4a, sidewalls 4b and rear wall 4d. The top cover 7 has the top wall 4c. A flange part 4e is formed integral with the edges of the top wall 4c, extending downwards from the top wall 4c. The top cover 7 is laid over the bottom case 6 and coupled to the bottom case 6 with a plurality of screws (not shown). Since the top cover 7 is so coupled to the bottom case 6, the flange part 4e abuts on the sidewalls 4b and the rear wall 4d.

On the outer surface of the top wall 4c of the top cover 7, a palm rest 8 and a keyboard holding part 9 are provided. The palm rest 8 is located on the front half part of the top wall 4c. The keyboard holding part 9 is positioned at the back of the palm rest 8, and supports a keyboard 10.

As FIGS. 1 to 3 show, a connector slot 12, a plurality of exhaust ports 13, and a lock hole 14 are made in the left sidewall 4b of the first housing 4. The connector slot 12 is an example of opening and located at the rear end of the left sidewall 4b. The exhaust ports 13 are arranged in a row and spaced apart in the depth direction of the first housing 4, and oppose the heat sink 5. The lock hole 14 is located more forward than the exhaust ports 13, to the front of the first housing 4.

As shown in FIG. 1, the display module 3 has a second housing 16. The second housing 16 is shaped like a flat box and has almost the same size as the first housing 4. The second housing 16 contains a liquid crystal display panel 17. The liquid crystal display panel 17 has a display screen 17a that can display text data and image data. The display screen 17a is exposed outside at the front of the second housing 16.

The display module 3 is supported at the rear end of the computer main module 2 by a pair of hinge devices 20 (only one is shown in FIG. 2). One of the hinge devices 20 spans the gap between the left end of the first housing 4 and the left end of the second housing 16. The other hinge device 20 spans the gap between the right end of the first housing 4 and the right end of the second housing 16. The hinge devices 20 are identical in major components. Only one of them will therefore be described below.

Figure 4:
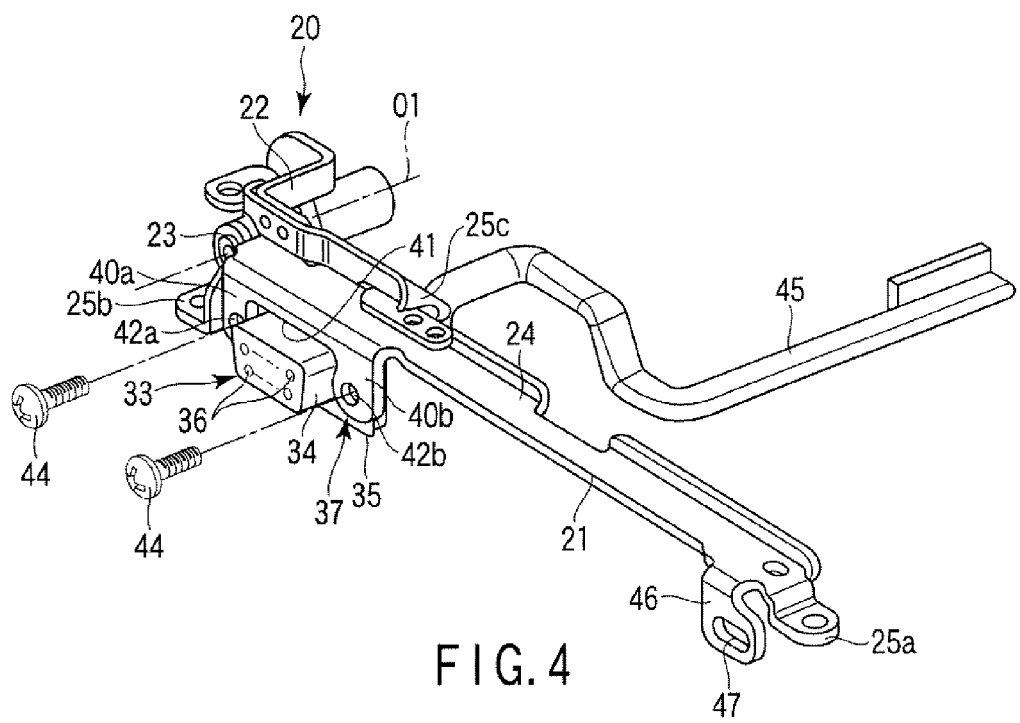
FIG. 4 is an exemplary perspective view of the first hinge arm used in the embodiment of the invention and an RGB connector secured to the first hinge arm.

As FIG. 4 shows, the hinge device 20 has a first hinge arm 21, a second hinge arm 22, and a hinge pin 23. The first and second hinge arms 21 and 22 are die-cast members made of metal such as aluminum alloy. They have sufficient mechanical strength and sufficient rigidity.

As shown in FIGS. 2 and 3, the first hinge arm 21 is fastened to the inner surface of the left part of the top wall 4c, and extends along the left sidewall 4b of the first housing 4. More precisely, the first hinge arm 21 has an arm body 24. The arm body 24 is a long, thin plate that extends depthwise relative to the first housing 4.

First to third fastening strips 25a, 25b and 25c are integrally formed with the arm body 24. The first fastening strip 25a is located at the front end of the arm body 24. The first fastening strip 25a is secured, with a screw 27, to a boss 26 projecting from the inner surface of the top wall 4c. The second fastening strip 25b is located at the rear end of the arm body 24. The second fastening strip 25b is secured with a screw (not shown) in a boss 28 that projects from within the top wall 4c. The third fastening strip 25c projects light side of the arm body 24 from the light side edge of the arm body 24. The third fastening strip 25c is secured with two screws 30 to two bosses 29, respectively. These bosses 29 project from within the top wall 4c.

Therefore, the arm body 24 extends straight, from the rear end of the first housing 4 toward the front of the first housing 4, passing over the connector slot 12, exhaust ports 13 and lock hole 14.

The second hinge arm 22 is provided in the second housing 16 of the display module 3. The second hinge arm 22 extends along the left side of the second housing 16, and is secured to the second housing 16 by means of, for example, screws.

The hinge pin 23 spans the gap between the first hinge arm 21 and the second hinge arm 22, coupling both arms 21 and 22 and allowing them to rotate. The hinge pin 23 has an axis O1. The axis O1 of the hinge pin 23 extends horizontally widthwise relative to the portable computer 1. The junction between the first hinge arm 21 and the hinge pin 23 and the junction between the second hinge arm 22 and the hinge pin 23 are covered with a hinge cover 31 shown in FIG. 1.

The display module 3 can rotate around the hinge pins 23 between a closed position and an open position. In the closed position, the display module 3 lies over the computer main module 2, covering the palm rest 8 and keyboard 10 from above. In the open position, the display module 3 stands at the rear end of the computer main module 2, exposing the palm rest 8 and keyboard 10 and the display screen 17a of the liquid crystal display panel 17.

As shown in FIGS. 1 and 2, an RGB connector 33 is fitted, at one end, in the connector slot 12. The RGB connector 22 is an example of an external connector. It is used to connect a peripheral device, such as an external monitor, to the portable computer 1.

As shown in FIGS. 4 to 6, the RGB connector 33 has a connector body 34 and a back panel 35. The connector body 34 has a plurality of pin ports 36, into which the pins of the connecting plug of the peripheral device can be inserted. The pin ports 36 open to the distal end of the connector body 34. The back panel 35 is a rectangular plate and is secured to the back of the connector body 34. The peripheral edges of the back panel 35 extend from the circumference of the connector body 34.

The RGB connector 33 is removable attached to the first hinge arm 21 of the hinge device 20. As shown in FIGS. 3 to 6, the first hinge arm 21 is integrally formed with a connector holding part 37. The connector holding part 37 projects downwards from the left side edge of the rear end of the arm body 24. The connector holding part 37 lies inside the left sidewall 4b of the first housing 4 and opposes the connector slot 12 made in the left sidewall 4b. The connector holding part 37 is therefore positioned, intersecting with the arm body 24 and opposing the third fastening strip 25c across the arm body 24.

The connector holding part 37 has a pair of tongues 40a and 40b and a notch 41. The tongues 40a and 40b are provided to hold the back panel 35 of the RGB connector 33. The tongues 40a and 40b are spaced from each other lengthwise relative to the first hinge arm 21. They have screw passages 42a and 42b, respectively. The screw passages 42a and 42b are axially aligned with two screw holes 43, respectively, which are formed in the back panel 35. (In FIG. 6, only one screw hole is illustrated.)

The notch 41 is lies between the tongues 40a and 40b so that the connector body 34 may be fitted in it. To be fitted in the notch 41, the connector body 34 penetrates the connector holding part 37 of the first hinge arm 21 in the direction of thickness of the connector holding part 37.

As shown in FIGS. 4 and 6, two screws 44 are inserted in the screw passages 42a and 42b made in the tongues 40a and 40b, respectively. The screws 44 extend through the left sidewall 4b and are driven into the screw holes 43 of the back panel 35. So driven, the screws 44 fasten the RGB connector 33 to the connector holding part 37 of the first hinge arm 21. The connector body 34 having the pin ports 36 is therefore exposed outside the computer main module 2 through the connector slot 12.

A wire harness 45 is drawn out from the back panel 35 of the RGB connector 33. The wire harness 45 is electrically connected to the RGB connector 33 and to the printed circuit board that is provided in the first housing 4.

As FIG. 4 shows, an engagement strip 46 is formed integral with the front end of the arm body 24. The engagement strip 46 extends downwards from the left side edge of the arm body 24 and opposes the lock hole 14 of the first housing 4. The engagement strip 46 has an engagement hole 47 that may be used to connect a theft preventing device to the portable computer 1. The engagement hole 47 is axially aligned with the lock hole 14.

In the portable computer 1 structured as described above, a connector holding part 37 is integrally formed with the first hinge arm 21 of either hinge device 20. A screw 44 fastens the RGB connector 33 to the connector holding part 37 of the first arm 21.

Hence, the first hinge arm 21, which is a component of the hinge device 20, can function as a connector panel for supporting the RGB connector 33. Brackets or the like dedicated to supporting the RGB connector 33 are not required at all.

This helps to reduce the number of components constituting the portable computer 1. This ultimately decreases the number of steps needed to manufacture the portable computer. The manufacturing cost of the portable computer 1 can therefore be reduced.

The reduction in the number of components provides a space around the RGB connector 33, for accommodating the other components. This enhances the freedom of arranging components inside the first housing 4. Further, this makes it possible to make the packing density of mounted components high.

In the embodiment described above, the RGB connector 33 can be removed from the connector holding part 37. The RGB connector 33 can therefore be easily replaced with a new one if it is damaged.

The connector holding part 37 is integrally formed with the arm body 24 and extends downwards from the left side edge of the arm body 24. The connector holding part 37 can therefore not only function as a rib reinforcing the arm body 24, but also increases the volume of the first hinge arm 21 by a value equivalent to its volume. As a result, the strength of the first hinge arm 21 increases. The first hinge arm 21 can therefore reliably withstand the torque that is applied to it when the display module 3 is rotated from the closed position to the open position, or vice versa. The display module 3 can therefore be rotated smoothly.

In addition, the first hinge arm 21 can reliably withstand the external force that is applied to the RGB connector 33 when the plug of the peripheral device is inserted into, or pulled out of, the RGB connector 33.

As described above, the connector holding part 37 opposes the third fastening strip 25c secured to the top wall 4c, across the arm body 24. Therefore, the top cover 7 can receive, through the third fastening strip 25c, the external force applied from the RGB connector 33 to the connector holding part 37.

The first hinge arm 21 can therefore firmly and steadily hold the RGB connector 33. This gives the RGB connector 33 an increased strength against an external force that may twist the RGB connector 33.

The present invention is not limited to the embodiment described above. Various changes and modifications can be made, without departing from the scope and spirit of the invention.

For example, the external connector may not be limited to a RGB connector. Rather, it may rather be any other connector such as a power supply connector or a LAN connector. Further, a switch operable with the fingertip, a microphone jack, or an earphone jack may be attached to the connector holding part of the first hinge arm.

Moreover, the connector slot 12 need not be made in a sidewall of the first housing 4. Instead, it may be made in the rear wall of the first housing. In this case, it suffices to arrange the first hinge arm in the first housing, so that the first hinge arm may extend along the rear wall.

In addition, a connector slot may be made in a sidewall of the second housing of the display module. If this is the case, a connector holding part is provided on the second hinge arm and located to oppose the connector slot, and the connector may be inserted, at one end, into this connector slot.

While certain embodiments of the inventions have been described, there embodiments have been presented by way of example only, and are not intended to limit the scope of the invention. Indeed, the novel methods and systems described herein may be embodied in a variety of other forms; furthermore various omissions, substitutions and changes in the form of the methods and systems described herein may be made without departing from the spirit of the inventions. The accompanying claims and their equivalents are intended to cover such forms or modifications as would fall within the scope and spirit of the inventions.

What is claimed is:

1. An electronic apparatus comprising:
a first housing including a peripheral wall provided with an opening;
a second housing;
a hinge configured to couple the first housing and the second housing to be rotatable relative to each other, the hinge including a hinge arm secured to the first housing, and a connector holding part integrally extending from the hinge arm and opposed to an inner surface of the peripheral wall of the first housing at positions located around the opening; and
an external connector secured to the connector holding part of the hinge arm and exposed to the outside of the first housing through the opening, the external connector including a connector body, and a back panel projected from the connector body to the inside of the first housing,
wherein the connector holding part of the hinge arm includes a pair of end portions configured to support the back panel, a notch portion in which the connector body can be fitted is provided between the end portions, and the back panel of the external connector is removably secured to the end portions of the connector holding part.

2. An electronic apparatus comprising:
a first housing provided with an opening;
a second housing;
a hinge configured to rotatably couple the first housing and the second housing, the hinge including: an arm secured to the first housing; a pair of end portions integrally extending from the arm and opposed to an inner surface of the first housing at positions located around the opening; and a notch portion located between the end portions; and
an external connector including a connector body and an extended portion, the connector body fitted in the notch portion and including an end surface exposed to the outside of the first housing through the opening, the extended portion being projected at positions which are located around the connector body and are opposite to the end surface of the connector body, the extended portion being removably secured to the end portions of the arm.

3. An electronic apparatus comprising:
a first housing provided with an opening;
a second housing;
a hinge configured to rotatably couple the first housing and the second housing, the hinge including (i) an arm secured to the first housing and (ii) an end portion integrally extending from the arm and opposed to an inner surface of the first housing at positions located around the opening; and
a connector including a connector body and an extended portion, the connector body including an end exposed to the outside of the first housing through the opening, the extended portion being projected at positions which are located around the connector body and are opposite to the end of the connector body, the extended portion being removably secured to the end portion of the arm.

4. The electronic apparatus of claim 3, wherein
the end portion comprises a pair of projected pieces, and the extended portion is secured to the pair of projected pieces.

5. The electronic apparatus of claim 4, wherein
the hinge is provided with a notch portion located between the pair of projected pieces, and the connector body is fitted in the notch portion.

6. An electronic apparatus comprising:
a first housing provided with an opening;
a second housing;
a hinge configured to rotatably couple the first housing and the second housing, the hinge including (i) an arm secured to the first housing and (ii) an end portion integrally formed as one piece on the arm and opposed to an inner surface of the first housing at positions located around the opening; and
a connector including an end exposed to the outside of the first housing through the opening and a portion located inside the first housing and removably secured to the end portion.

7. The electronic apparatus of claim 6, wherein
the end portion comprises a pair of projected pieces, and the connector is secured to the pair of projected pieces.

8. The electronic apparatus of claim 7, wherein
the hinge is provided with a notch portion which houses at a least a part of the connector between the pair of projected pieces.

9. The electronic apparatus of claim 8, wherein
the connector includes an extended portion, and
the extended portion includes the portion removably secured to the end portion and is projected at positions which are located around the connector and are opposite to the end.

\* \* \* \* \*